(12) United States Patent
Chen

(10) Patent No.: US 6,276,262 B1
(45) Date of Patent: Aug. 21, 2001

(54) SYSTEM AND METHOD OF CHINESE TEA BREWING

(76) Inventor: Jason C. S. Chen, 24511 SE. 39th Pl., Issaquah, WA (US) 98029

( * ) Notice: Subject to any disclaimer, the term of this patent is extended or adjusted under 35 U.S.C. 154(b) by 0 days.

(21) Appl. No.: 09/558,932

(22) Filed: Apr. 26, 2000

(51) Int. Cl.⁷ .............................. A47J 31/00; A23F 3/00
(52) U.S. Cl. .............................. 99/322; 99/317; 99/306; 99/323; 426/435
(58) Field of Search .............................. 99/299, 304, 306, 99/317, 318, 319, 322, 323; 426/433, 435

(56) References Cited

U.S. PATENT DOCUMENTS

| | | |
|---|---|---|
| 966,735 | 8/1910 | Chapman . |
| 1,108,288 * | 8/1914 | Watson .................................. 99/306 |
| 1,937,203 * | 11/1933 | Nash ...................................... 99/322 |
| 2,245,389 * | 6/1941 | Cremer .................................. 99/306 |
| 2,684,624 | 7/1954 | Alvarez .................................. 99/298 |
| 2,742,849 * | 4/1956 | Stiglitz .................................. 99/299 |
| 2,951,431 | 9/1960 | Hugentobler ........................... 99/299 |
| 3,063,359 * | 11/1962 | Brant ...................................... 99/306 |
| 3,484,245 | 12/1969 | Goto . |
| 3,592,125 | 7/1971 | Tolmie .................................. 99/307 |

FOREIGN PATENT DOCUMENTS

| | | |
|---|---|---|
| 1 196 831 | 7/1965 | (DE) . |
| 6607861 | 5/1971 | (DE) . |
| 2137040 | 2/1973 | (DE) . |
| 28 29 775 | 1/1980 | (DE) . |
| 3213784 | 10/1983 | (DE) . |
| 35 12 920 | 1/1986 | (DE) . |
| 3743050 | 2/1989 | (DE) . |
| 0 019 291 | 11/1980 | (EP) . |
| 0 131 935 | 1/1985 | (EP) . |
| 0 163 896 | 12/1985 | (EP) . |
| 0 227 200 | 7/1987 | (EP) . |
| 0 283 569 | 9/1988 | (EP) . |
| 0 294 579 | 12/1988 | (EP) . |
| 0 299 145 | 1/1989 | (EP) . |
| 0 327 822 | 8/1989 | (EP) . |
| 429 722 | 9/1911 | (FR) . |
| 1196574 | 11/1959 | (FR) . |
| 1584848 | 1/1970 | (FR) . |
| 282 | 1/1877 | (GB) . |
| 545902 | 6/1942 | (GB) . |
| 2111377 | 7/1983 | (GB) . |
| 2135570 | 9/1984 | (GB) . |
| 62-11848 | 3/1987 | (JP) . |
| 100 411 | 7/1959 | (NR) . |

* cited by examiner

*Primary Examiner*—Reginald L. Alexander
(74) *Attorney, Agent, or Firm*—Black Lowe & Graham PLLC

(57) ABSTRACT

An automatic tea brewing system and method comprising a tea brewer with a water discharge hole at the its lower end, a mesh filter above the tea water discharge hole, and a teapot positioned to receive brewed tea discharged from the water discharge hole. The tea brewer and the water discharge hole are configured and sized to allow holding a certain amount of water flowing naturally through the water discharge hole in a predetermined amount of time, thereby automatically controlling the manner and rate of tea brewing. The mesh filter is of basket or disk shape, and is removable or non-removable. An optional lid or saucer may be added to the system as separate units, shaped and sized to fit with the tea brewer and teapot. Tea is automatically brewed by resting the tea brewer on the teapot, placing tealeaves into the tea brewer on top of the mesh filter, pouring water into the tea brewer to soak the tealeaves in the tea brewer, discharging brewed tea from the tea brewer through the water discharge hole into the teapot, and separating the soaked tealeaves from the brewed tea based on the position of the tea brewer in relation to the teapot and the size of the teapot, whereby brewed tea is discharged from the tea brewer fully into the teapot such that the level of brewed tea does not reach the lower end of the tea brewer, while soaked tealeaves are retained in the tea brewer.

21 Claims, 7 Drawing Sheets

SYSTEM AND METHOD OF CHINESE TEA BREWING

FIELD OF THE INVENTION

The present invention relates to a system and method for quickly, conveniently and automatically brewing high quality Chinese tea.

BACKGROUND OF THE INVENTION

Traditionally, Chinese tea brewing emphasized the color, smell, and taste of the brewed tea. Chinese tea brewing is believed to be a form of art that requires the pleasure of enjoying the material, size and shape of the tea brewer. Brewing Chinese tea requires the right amount of tealeaves, hot water, and brewing time to soak the tealeaves in the hot water. If the tealeaves soak in the water too long, the tea water becomes bitter or astringent. The quantity of tea made each time should not be too voluminous, otherwise the art of making Chinese tea is lost. The tea made is for the enjoyment of the flavor of the tea itself. It requires special attention to the optimal amount of tea brewed, the optimal ratio of water to tea, the optimal amount of steeping time, and the optimal material of the tea brewer. Under the traditional Chinese brewing techniques, clay, purple clay and porcelain are favorably used as materials for the tea brewer. The hot water brewer is a separate mechanism not connected to the tea brewer so that brewing tea itself is not complicated or bulky. The amount of tea brewed is not voluminous so that the flavor of tea can be tasteful and with natural fragrance. However, determination and control of the amount of tealeaves, the amount of hot water, and the right amount of brewing time to obtain the optimal flavor of tea brewed has been a constant challenge. For example, if the tealeaves soak in the water too long, the tea becomes bitter or astringent. Current systems and methods of making traditional Chinese tea suffer from a number of disadvantages.

One of the traditional ways to brew Chinese tea is using a small teapot with a handle on one side and a spout on the other side. Occasionally there is a filter inside the teapot around the opening of the spout to prevent tealeaves from going into the spout when the brewed tea is poured out from the teapot. In this kind of traditional tea brewing, tealeaves are put into the teapot and hot water is added. It is up to each individual person's experience to determine the amount of tealeaves and the length of time for the hot water to steep the tealeaves. When it is determined that the time is sufficient to steep the tealeaves, brewed tea was poured from the teapot. The problem with this traditional way to brew a Chinese tea is that it relies on each individual person's experience to determine the amount of tealeaves, the amount of water, and the length of time for the hot water to steep the tealeaves. This results in inconsistent brewing time. Another problem is that once the time is determined, forgetting to pour brewed tea from the teapot at the predetermined time results in the tealeaves being soaked in the water too long. When tealeaves are soaked in the water too long, the tea becomes bitter or astringent. A further inconvenience is that there is a need to tilt the teapot in a certain way, or press the lid firmly, while pouring out the brewed tea so that the lid of the teapot does not drop when the teapot is tilted for pouring.

Another conventional method is to use a second, larger teapot. After the tea is brewed in the traditional teapot, the brewing teapot is tilted with its spout being inserted into the upper opening of the larger teapot, with the brewing teapot resting on the larger teapot in this position until the brewed tea poured completely into the larger teapot. Then the brewing teapot was taken away. With this method, the inconvenience of holding the teapot in a certain position is avoided, and the inconvenience of using a hand to press firm the lid while pouring tea is avoided. However, this device still requires the user to remember the time to pour the tea out of the tea brewer for purpose of separating the soaked tealeaves from the tea brewed to avoid tealeaves being steeped too long.

Another conventional device is using a cup with holes to sit inside the teapot. When the tea is done brewing, the cup is taken out of the teapot, and the brewed tea remains inside the teapot. By this way, there is no need to pour the brewed tea from the teapot, and the inconvenience to the user of holding his or her hand in a certain way, or using the other hand to press firm the lid while the tea was pouring, is avoided. However, this device still requires the user to remember the time to take the cup out of the tea brewer for purpose of separating the soaked tealeaves from the tea brewed at due time to avoid the tealeaves being steeped too long.

Another conventional device is using a cup to sit in the teapot with a hole at the bottom of the cup. The hole is initially in a closed position. When the tea is done brewing, the hole is opened allowing the brewed tea to discharge rapidly into the bottom of the teapot. In this method, there is no need to pour the brewed tea from the teapot, and the inconvenience to the user of holding his or her hand in a certain way, or using the other hand to press firm the lid while the tea was pouring, is avoided. However, this device still requires the user to remember to press the bottom to allow the brewed tea to be discharged and to separate the soaked tealeaves from the tea brewed to avoid the tealeaves being steeped too long.

Another conventional device also uses a cup to sit in the teapot with two tiers of bottoms, each with a hole. When the tealeaves are steeped, the two holes are not in line; thus, the bottom of the cup is in closed position. When the tea is done brewing, the cup was turned to a position that the two holes are in line so that the hole is open in the bottom of the cup and the brewed tea is discharged rapidly into the bottom of the teapot. In this method, there is no need to pour the brewed tea from the teapot, and the inconvenience to the user of holding his or her hand in a certain way, or using the other hand to press firm the lid while the tea was pouring, is avoided. However, this device still requires the user to remember to activate the hole to allow the brewed tea to be discharged and to separate the soaked tealeaves from the brewed tea at due time to avoid the tealeaves being brewed too long.

Thus, making high quality tea according to the traditional Chinese method is time consuming. After tealeaves are put into the teapot and hot water is added to the teapot, it requires careful monitoring to ensure proper brewing time. If the proper brewing time is not applied, the tealeaves soak in the water too long and the brewed tea loses the right flavor. Thus, making a traditional Chinese tea requires attention to time and the additional motion of pouring the brewed tea out of the teapot or separating the soaked tealeaves from the brewed tea, by either placing the tea brewer on top of another teapot, taking the cup out of the teapot, pressing a bottom to open a hole, or turning the cup to open a hole. Such detailed attention is not practical for most people. As a result, people settle for tea of inferior quality. The conventional devices fail to address these problems. Representative prior art structures demonstrate the limitations of existing technology and point up the advantages of the present invention.

U.S. Pat. No. 5,125,327 describes a teapot with an infuser to carry tealeaves. While this structure allows loose tea to be infused while preventing tealeaves from leaving the pot with the stream of brewed tea, it does not address the problem of automatically brewing tea at the right time and separating the tealeaves from the brewed tea. This structure also requires the brewed tea be poured out of the teapot.

U.S. Pat. No. 2,948,618 describes a method for brewing coffee using a water reservoir above a conical shaped coffee holding member with an apex opening and a receptacle to collect the brewed coffee. While this structure allows a separation of coffee grounds from the brew, which has requirements that are distinct from those of traditional Chinese tea. Brewed coffee is heavy and more ideally suited for the purpose of adding a proper amount of sugar and cream to achieve its optimum favor. Traditional Chinese tea is brewed not for the purpose of adding sugar or creme. Coffee ground normally is brewed only once, whereas in traditional Chinese tea, tealeaves are brewed up to five times, with three times being optimal. The requirements of optimal ratio of tealeaves to water and optimal tea steeping time are more stringent than brewing coffee.

U.S. Pat. No. Re. 34,482 describes an appliance for brewing coffee or tea where water is received in a reservoir and heated and the resulting steam is passed to a container for holding coffee or tea with an overflow port. When used with tea, the brewed tea reaches the overflow port, overflowing liquid drops into the receptacle and is cooled by ice therein to form iced tea. While this structure allows a separation of the liquid from the ingredient, the appliance focuses mainly on coffee or iced tea, which has requirements distinct from those of traditional Chinese tea. Brewed coffee normally is heavy and more ideally suited for the purpose of adding a proper amount of sugar and cream to achieve its optimum flavor, and iced tea is more ideally suited for adding ices. Traditional Chinese tea is not brewed for the purpose of adding sugar or creme or ice. Coffee ground normally is brewed only once, whereas in traditional Chinese tea, tealeaves are brewed up to five times, with three times being optimal. The requirements of optimal ratio of tealeaves to water and optimal tea steeping time are more stringent with Chinese tea that when brewing coffee. This device emphasizes the technique of automatically supplying heated water to the brewer, thus, the system is bulky and complicated and does not provide the ideal environment of making traditional Chinese tea. The amount of tealeaves to the water ratio is not calculated to obtain the optimal flavor. And the tea is made primarily for the purpose of adding ice or sugar to become iced tea, which suppresses rather than emphasizes the flavor of the tea.

European Pat. No. 0227 200 describes an apparatus where heated water is supplied over a device for holding a bed of tealeaves. Hot water remained in contact with tealeaves in the bed for a predetermined time, and the brewed tea is discharged using a siphon tube to siphon the brewed tea from lower a point to higher point. The tube is then bent over and extended downward to allow for discharge. While this structure allows hot water to remain in contact with the tealeaves for a period of time, the method used to discharge brewed tea from the tea brewer is against the natural flow of gravity and thus inconvenient and inefficient.

For the foregoing reasons, there is a need for a tea brewer that automatically and efficiently controls the brewing time for optimum flavor of traditional Chinese tea. The present invention provides a device for automatically brewing a traditional Chinese tea at the optimal amount of brewing time, without the monitoring and other user requirements required with current systems and methods. After hot water is added to the tea brewer, the system automatically brews tea at the right time and separate the tealeaves from the brewed tea, resulting in tea of a quality ordinarily only obtained by traditional Chinese methods, but much more conveniently.

SUMMARY OF THE INVENTION

This invention provides an automatic tea brewing system and method for making a traditional Chinese tea efficiently, quickly and easily.

The apparatus includes three basic parts: a tea brewer, a mesh filter, and a teapot. The mesh filter is located above a water discharge hole at the lower end of the tea brewer. In a preferred embodiment, the lower end of a tea brewer is curved for easy drainage purpose. The teapot is positioned to receive the water discharged from the tea brewer through the water discharge hole. The water discharge hole is sized to allow the water to discharge at a rate that provides the optimal brewing time. The tea brewer is sized to hold the right amount of water and the right amount of tealeaves so that water naturally flows through the tealeaves, filter and the water discharge hole at a rate that allows for the optimal amount of brewing time for the tealeaves.

The tea brewer generally is open in the upper end and closed in the lower end, with the lower end being curved for easy drainage, and with a small water discharge hole at the lower end. The small water discharge hole is located under the mesh filter. In a preferred embodiment, the tea brewer is generally cylindrical and divided into upper and lower sections. The lower section is narrower to fit into the upper opening of the teapot. In one preferred embodiment, the outside of the tea brewer has a raised annular ring about its circumference. The teapot opening is sized to fit under the raised annular ring so that the part of tea brewer below the raised annular ring is inside the opening of the tea brewer. The raised annular ring can be broken and not continuous.

The mesh filter is made of conventional materials with a tiny mesh or fine screen. The filter is located on top of the water discharge hole. The mesh filter can be basket-shaped. The basket-shaped filter may be inserted inside the tea brewer or it can be rest on a tea brewer with the basket inside the tea brewer. The basket-shaped mesh filter can be non-removable, or it can be easily removed by fingers or by dumping it out from the top of the tea brewer. Alternatively, the mesh filter can be of a flat shape or have slightly concave disk and rest inside the lower portion of the tea brewer. In a preferred embodiment, the disk shape mesh filter is inserted under an annular convex ring around the inner lower part of the tea brewer. The disk shape mesh filter can be removed by poking it from the water discharge hole. The filter is sized to hold the right amount of tealeaves and to prevent clogging of tealeaves in the water discharge hole, and for easy cleansing of the inside bottom of the tea brewer.

The teapot is open in the upper end and closed in the lower end with the lower end substantially flat to rest on a flat surface, such as a table. The teapot is sized and shaped to fit under the tea brewer's upper section or under the tea brewer's raised annular ring or outer convex line, or otherwise generally arranged below the tea brewer so as to collect brewed tea from the water discharge hole. The height and depth of the teapot is sized to store the brewed tea discharged from the water discharge hole so that the water level does not touch the bottom of the tea brewer. The teapot may have a handle on one side and a spout on the other side. The teapot can alternatively have only one handle or may be shaped for use as a teacup.

A lid can be added to the top of the tea brewer. The lid, the tea brewer, and the teapot are separate units, and are shaped and sized to fit each other. When combined, the lid, the tea brewer, and the teapot become an upright tea brewer set. The lid is shaped and sized to fit on top of the tea brewer and, alternatively, may have an aperture near the center of the lid. Alternatively, the lid can also become the cover of the teapot, or it can be shaped so that when it is turned upside down, it becomes the saucer as a tray for the tea brewer. The lid, as a saucer tray for the tea brewer, can be shaped as a flat bottom to rest on flat surface, or it can have a raised rim to rest on the surface.

A saucer can be added to the set as the tray for the tea brewer. The saucer can be shaped to fit the bottom of the tea brewer as well as the bottom of the teapot so that the upright tea brewer set includes the lid, the tea brewer with filter, the teapot and the saucer. Alternatively, the saucer can be shaped so that it can serve as a teacup.

Using the above system, making high quality tea becomes easy, efficient and automatic. The proper amount of tealeaves is placed inside the tea brewer on top of the filter (in case of a flat or slightly curve or concave disc filter) or inside the filter (in case of a basket shape filter) and hot water is added to the tealeaves filling up to the top of the tea brewer. The lid may also be closed. Once that is done, the system automatically brews a Chinese tea with the right amount of brewing time, and separates the tealeaves from the brewed tea. Under the force of gravity, the hot water flows naturally and slowly through the tealeaves, the filter, and the water discharge hole to the teapot. The size of the tea brewer controls the amount of tealeaves and water used in the system. The size of the tea brewer and the size of the water discharge hole further controls the rate as which the hot water naturally flows through the tealeaves and the length of time that it takes the hot water to steep the tealeaves while waiting to be discharged from the tea brewer. During brewing, the teapot automatically receives the freshly brewed tea until all the brewed tea is discharged from the water discharge hole; hence there is no need to rely on the user to remember the time to pour the brewed tea or to separate the soaked tealeaves from the brewed tea. There is no need to place the tea brewer on top of another teapot, take the cup out of the teapot, press a bottom to open a hole, or turn the cup device to open a hole, as the above conventional devices require, in order to separate the tealeaves from the brewed tea. The level of brewed tea discharged from the tea brewer does not reach the bottom of the tea brewer. This prevents the soaked tealeaves in the tea brewer from repeatedly being soaked in the brewed tea stored in the teapot.

An object of the invention is to provide a system and method for making traditional Chinese tea with the proper amount of brewing time.

An object of the invention is to provide a system and method for making traditional Chinese tea with the proper amount of water, tealeaves and water-to-tealeaves ratio.

Another object of the invention is to provide a system for making traditional Chinese tea without the need to monitor the brewing time and without the need to pour the brewed tea from the tea brewer.

Another object of the invention is to provide a system for making traditional Chinese tea with the brewed tea naturally being separated from the soaked tealeaves.

Another object of the invention is to provide a system for making traditional Chinese tea that captures the flavor of tealeaves during brewing.

Another object of the invention is to provide a system for making traditional Chinese tea that is easy to use and easy to clean.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
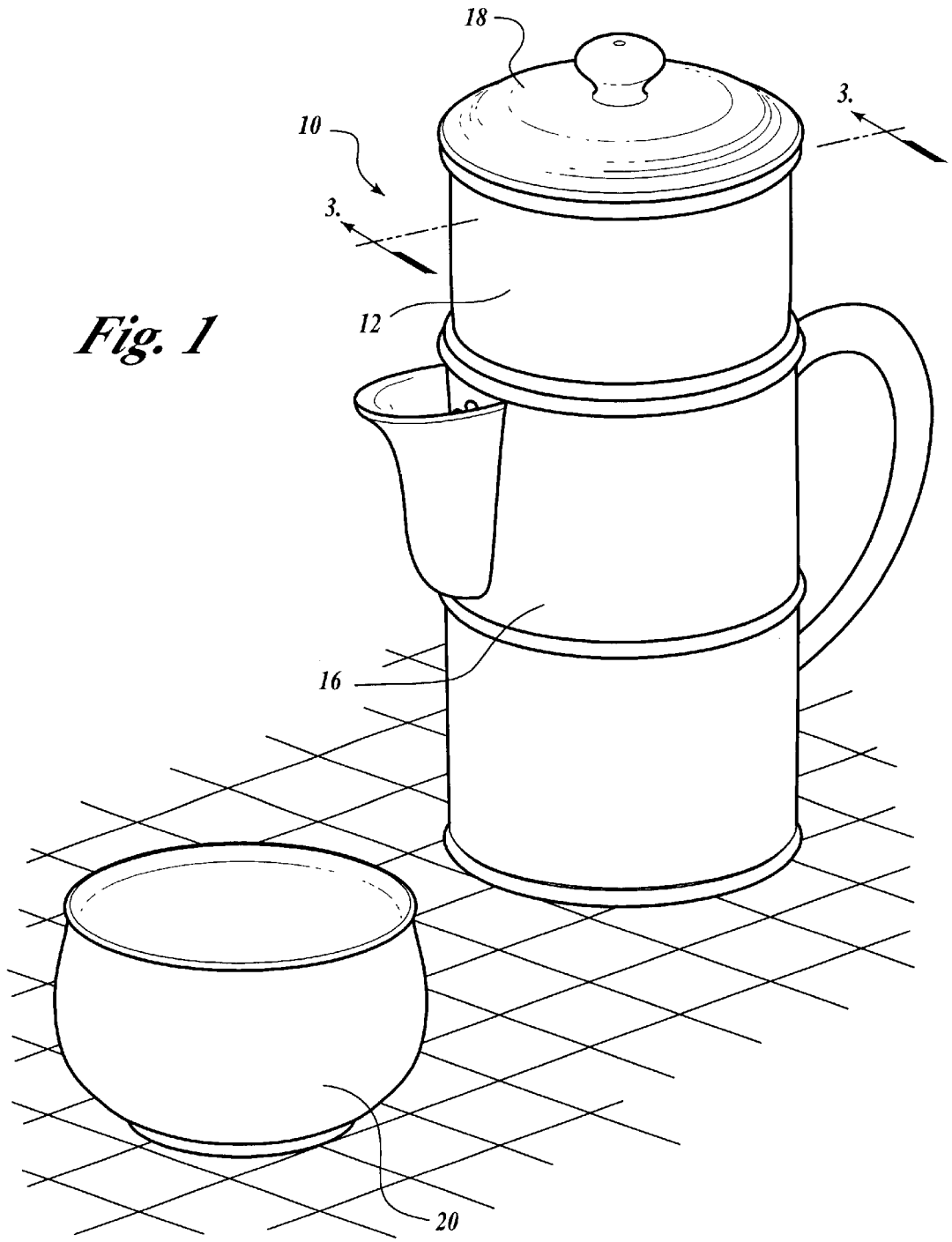
FIG. 1 is a perspective view of a Chinese tea brewing system illustrating a preferred embodiment of the present invention including tea brewer and teapot, with optional lid and saucer shown.
Figure 2:
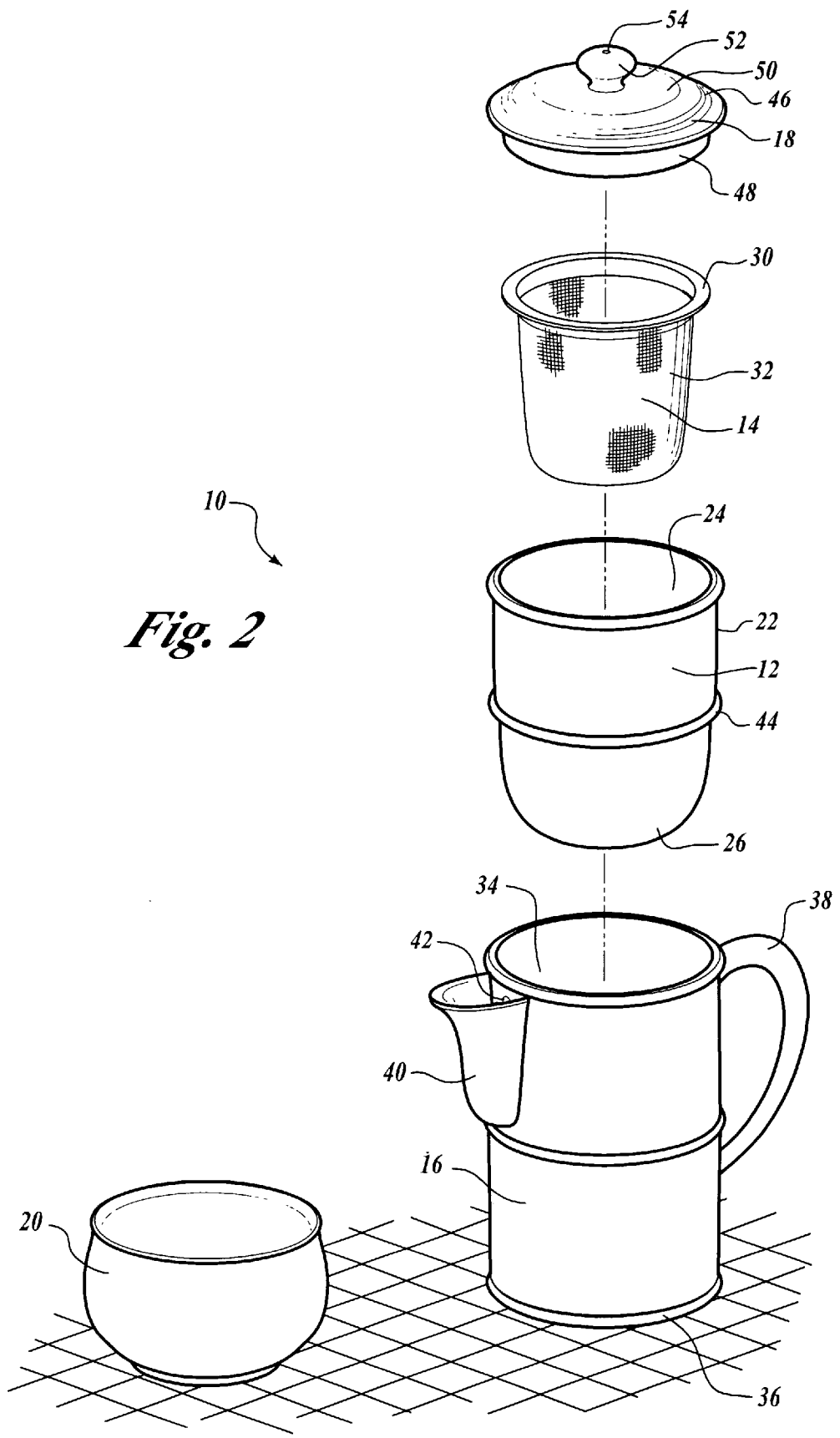
FIG. 2 is an exploded view of FIG. 1.
Figure 3:
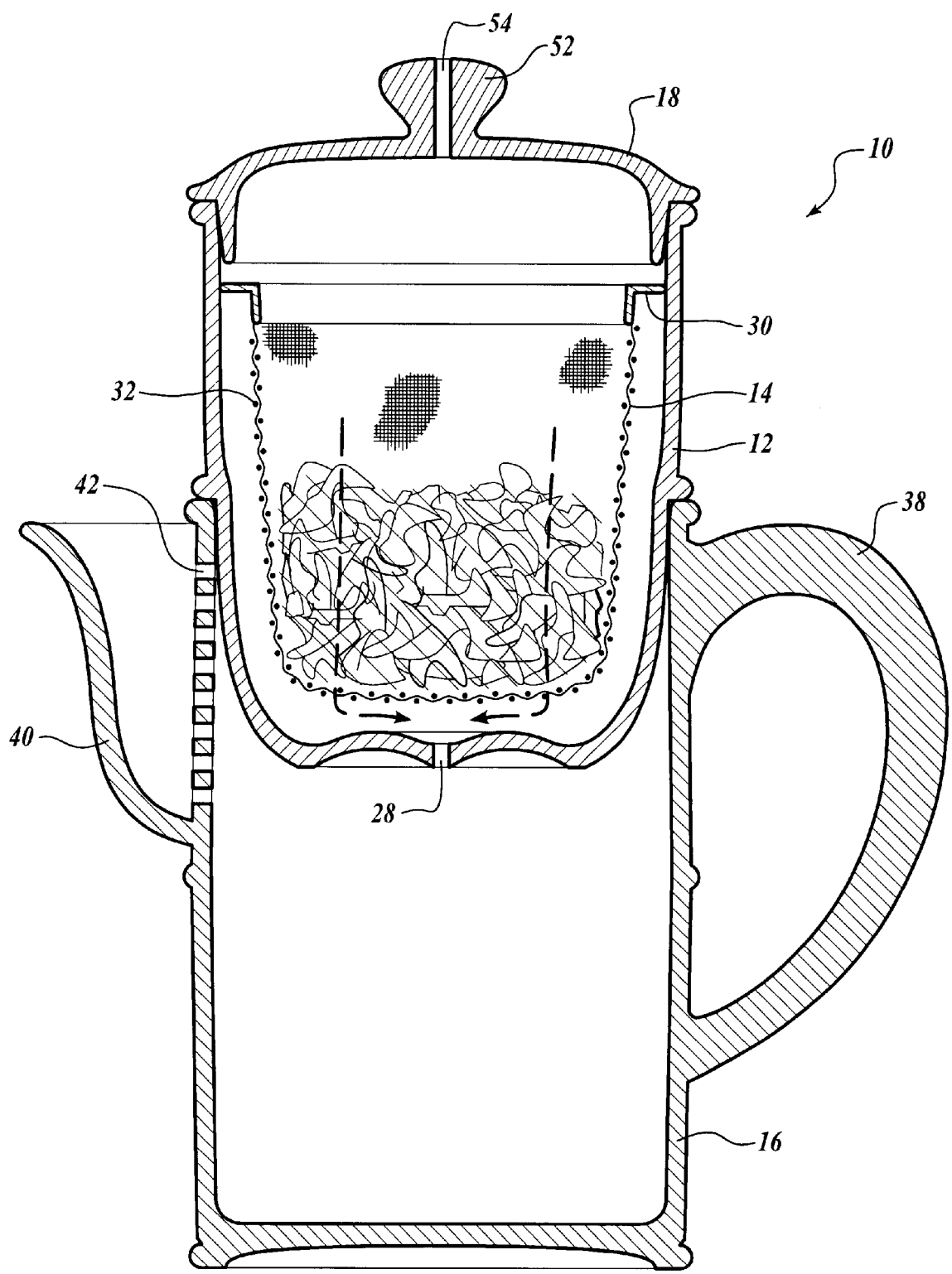
FIG. 3 is a sectional view taken alone line 3—3 of FIG. 1 showing a basket-shaped mesh filter.

The present invention is better understood with reference to the drawings, which are presented for the purpose of illustrating the preferred embodiments of the present invention, and not for the purpose of limiting the same. FIGS. 1, 2 and 3 show a Chinese tea brewing system of the present invention, with optional lid and saucer. Chinese tea brewing system 10 is generally comprised of a tea brewer 12, a mesh filter 14, and a teapot 16. Illustrated in FIG. 1 is an optional lid 18 and a saucer 20, either of which can be added to the Chinese tea brewing system 10 as alternatives.

With reference to FIG. 2, tea brewer 12 is comprised of a circular wall 22 having an open upper end 24 and a closed lower end 26. With reference to FIG. 3, tea brewer 12 further comprises a water discharge hole 28 located generally at the lower end 26. In the preferred embodiment of tea brewer 12, the lower end 26 may be curved with a concave, convex, or arched shape around the water discharge hole 28. The water discharge hole 28 is generally smaller than the upper opening 28 of tea brewer 16, and sized to control the speed of natural flow of water from the tea brewer 12 through the water discharge hole. The water discharge hole, in turn, controls the time that the tealeaves brew in the water.

The diameter of water discharge hole 28 is preferably from 0.16 cm to 0.25 cm, and more preferably from 0.18 cm to 0.2 cm. At a diameter less than 0.16 cm, the water discharge hole can be clogged easily and hinder the water flow. At a diameter more than 0.25 cm, the water from tea brewer 12 discharges quickly and the time that the water stays in tea brewer 12 is reduced, which results in less brewing time and a poorer flavored tea.

The tea brewer 12 generally is sized to control the amount of tealeaves and water, the ratio of water to tealeaves, and, along with the size of water discharge hole 28, the time it takes for the water to flow completely through the water discharge hole. The size of tea brewer 12 in combination with the size of the water discharge hole 28 controls the tea brewing time.

The size of the tea brewer 12 is typically smaller than the size of teapot 16. The size of the tea brewer is preferably from 120 cc to 270 cc, and more preferably from 150 cc to 240 cc. At a volume less than 120 cc, the amount of tea brewed if frequently insufficient for serving. At a volume more than 270 cc, the tea brewer appears bulky and does not reflect the traditional art of Chinese tea brewing.

The recommended amount of tealeaves for brewing in tea brewer of the present invention having a volume from 120 cc to 270 cc and the water discharge hole sized from 0.16 cm to 0.25 cm is approximately 3 to 5 grams, depending on personal preference for darker or lighter brewed tea. The water in the tea brewer 12 steeps tealeaves while at the same time gradually discharging the water through water discharge hole 28. In this specific embodiment, water is completely discharged from tea brewer 12 in one to two minutes. With the tea brewer having a of volume from 150 cc to 240 cc and the water discharge hole diameter from 0.18 cm to 0.2 cm, the water in completely discharged from the tea brewer in one minute and twenty seconds to one minute and forty-five seconds. These ranges of brewing time are preferable for brewing traditional Chinese tea. With a brewing time less than one minute, the tealeaves are insufficiently brewed. With a brewing time more than two minutes, the tealeaves are steeped too long. With the preferred embodiment of the present invention, the tea brewing system automatically determines the exact amount of water and tealeaves and the exact amount of brewing time. Using the system, tealeaves can generally be brewed again for a total of about three times. Each time the tealeaves are automatically steeped for the preferable time as above indicated and retain optimum flavor.

The recommended water temperature for brewing most types of tealeaves for Chinese tea is hot boiled water. Where this water is used, it is generally preferable to use heavy fermented Oolong tealeaves and medium fermented Oolong tealeaves. Where mild warm water is used, green tealeaves and light fermented Oolong tealeaves tend to be better. Mild warm water is hot boiled water that sits about five to six minutes in room temperature after boiling.

With reference to FIG. 2, mesh filter 14 is basket-shaped and comprises a circular edge 30 and a basket 32. Mesh filter 14 may be inserted into tea brewer 12. Alternatively, the circular edge 30 of filter 14 can rest along the upper opening 24 of the tea brewer 12, with basket 32 resting in the interior of tea brewer 12. Mesh filter 14 is easily removable by the user via hand, or by dumping it out from the upper opening 24 of the tea brewer. Alternatively, mesh filter 14 can be non-removably set in tea brewer 12. A removable mesh filter is preferable for cleaning purpose.

With reference to FIG. 3, mesh filter 14 is generally located above the water discharge hole 28. Mesh filter 14 is preferably comprised of tiny mesh or fine screen with a density typically from 90 to 150 holes per square inch, and most preferably 120 holes per square inch. At density of less than 90 holes per square inch, the mesh holes allow bits of tealeaves or tea material to pass through the mesh holes and to clog the water discharge hole 28. At a density of more than 150 holes per square inch, mesh holes slow the flow of water, especially when soaked tealeaves cover the holes, which makes water flow difficult. Filter mesh or screen material can be of any kind, preferably stainless steel. The area between mesh filter 14 and the water discharge hole 28 is sized to allow the water to naturally flow through the tealeaves, filter, and the water discharge hole without clogging water discharge hole 28.

FIG. 2 shows teapot 16 generally comprised of a body with an open upper end 34 and a closed lower end 36. Teapot 16 may also include a handle 38 and a spout 40 having a spout opening 42. Teapot 16 may also be shaped for use also as a teacup. With reference to FIG. 3, teapot 16 is generally sized to allow tea brewer 12 to be removably mounted along the open upper end 34 of the teapot, the closed lower end 26 of the tea brewer 26 resting in the interior of teapot 16.

It will be appreciated by those skilled in the art that the shape and configuration of tea brewer 12 and teapot 16 can be varied without departing from the scope of the present invention. For example, tea brewer 16 can be configured such that its open upper end 24 is of larger diameter than its closed lower end 26 and open upper end 34 of teapot 16, thereby allowing the open upper end 24 to rest on top of teapot 16 with the closed lower end 26 of the tea brewer resting inside open upper end 24 of teapot 16. Alternatively, tea brewer 12 may be configured with a raised annular rim 44, the diameter of which is larger than the open upper end 34 of the teapot so as to allow the tea brewer to rest along the open upper end 34 of the teapot. This allows the open upper end 24 of the tea brewer to be either larger or smaller than the closed lower end 26 of the tea brewer while still allowing tea brewer 12 to rest along the open upper end 34 of the teapot. In this alternative, the diameter of the closed lower end 26 of tea brewer 12 below the raised annular rim 44 is generally smaller than the diameter of open upper end 24 of the tea brewer, thereby allowing the closed lower end of the tea brewer to fit within the teapot. Regardless of the specific embodiment, configuring the tea brewer to mount closely along the open upper end 34 of the teapot prevents the escape of flavor and improves the resulting brewed tea.

In yet another alternative embodiment, tea brewer 12 includes one or more external ears or handles. These handles may facilitate easier handling of the tea brewer as well as provide added diameter to enable the tea brewer to rest on a larger teapot.

In use, tealeaves are put inside basket-shaped mesh filter 14 as it rests in tea brewer 12 and water is added. The water steeps the tealeaves inside tea brewer 12 while discharging gradually through the water discharge hole 28 into teapot 16. Teapot 16 is sized to allow the water to be completely discharged into the teapot. The soaked tealeaves are automatically separated from the brewed tea. The water steeps the tealeaves in tea brewer 12 and discharges completely into teapot 16 within a period of time determined by the size of the tea brewer 12 and water discharge hole 28. Thus, brewed tea from tea brewer 12 is automatically inside teapot 16 after a predetermined period of brewing time. This eliminates the monitoring required using traditional Chinese tea brewing systems.

Figure 4:
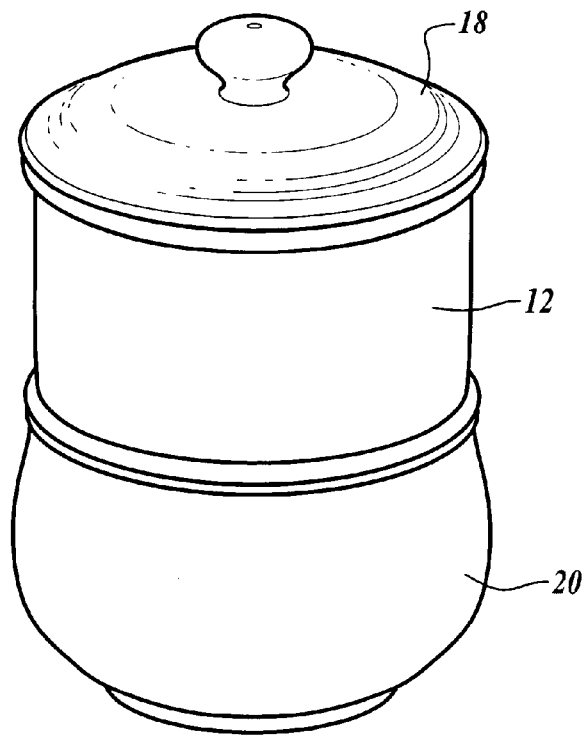
FIG. 4 is a perspective view of the tea brewer with an optional saucer.
Figure 5:
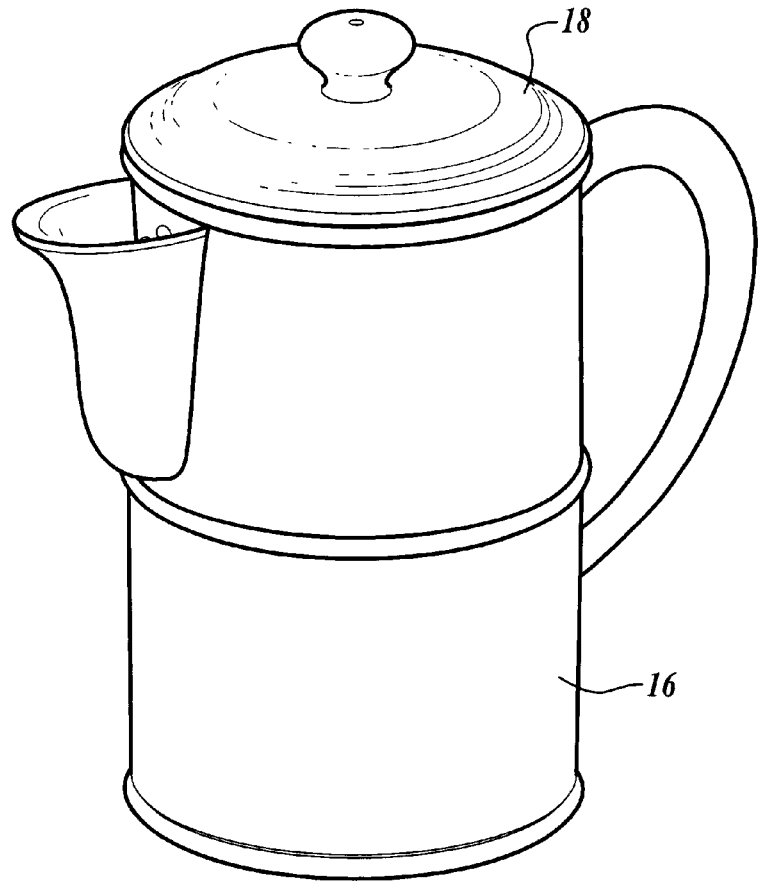
FIG. 5 is a perspective view of the teapot with an optional lid.

The present invention further includes an optional lid 18 and saucer 20. With reference to FIG. 2, the preferred embodiment of lid 18 generally comprises a partially hemispherical body 46 having a lower portion 48 with a diameter smaller than that of body 46 and an upper portion 50 having a knob 52 or other handle generally in the middle of the upper portion. Alternatively, knob 52 further includes an aperture 54 for air circulation during tea brewing. Lid 18 is generally shaped to removably mount on open upper end 24 of tea brewer 12. Referring to FIGS. 4 & 5, it will be appreciated that lid 18 can be sized to fit the open upper ends of either or both tea brewer 12 and teapot 16.

With reference to FIGS. 1 & 4, saucer 20 is sized to receive closed lower end 26 of tea brewer 12. As shown in FIG. 4, tea brewer 12 may be placed on saucer 20 so that the tea brewer does not wet the serving area. Saucer 20 can be sized so that it can also serve as a teacup. It will be appreciated that saucer 20 may also include one or more handles.

Figure 6:
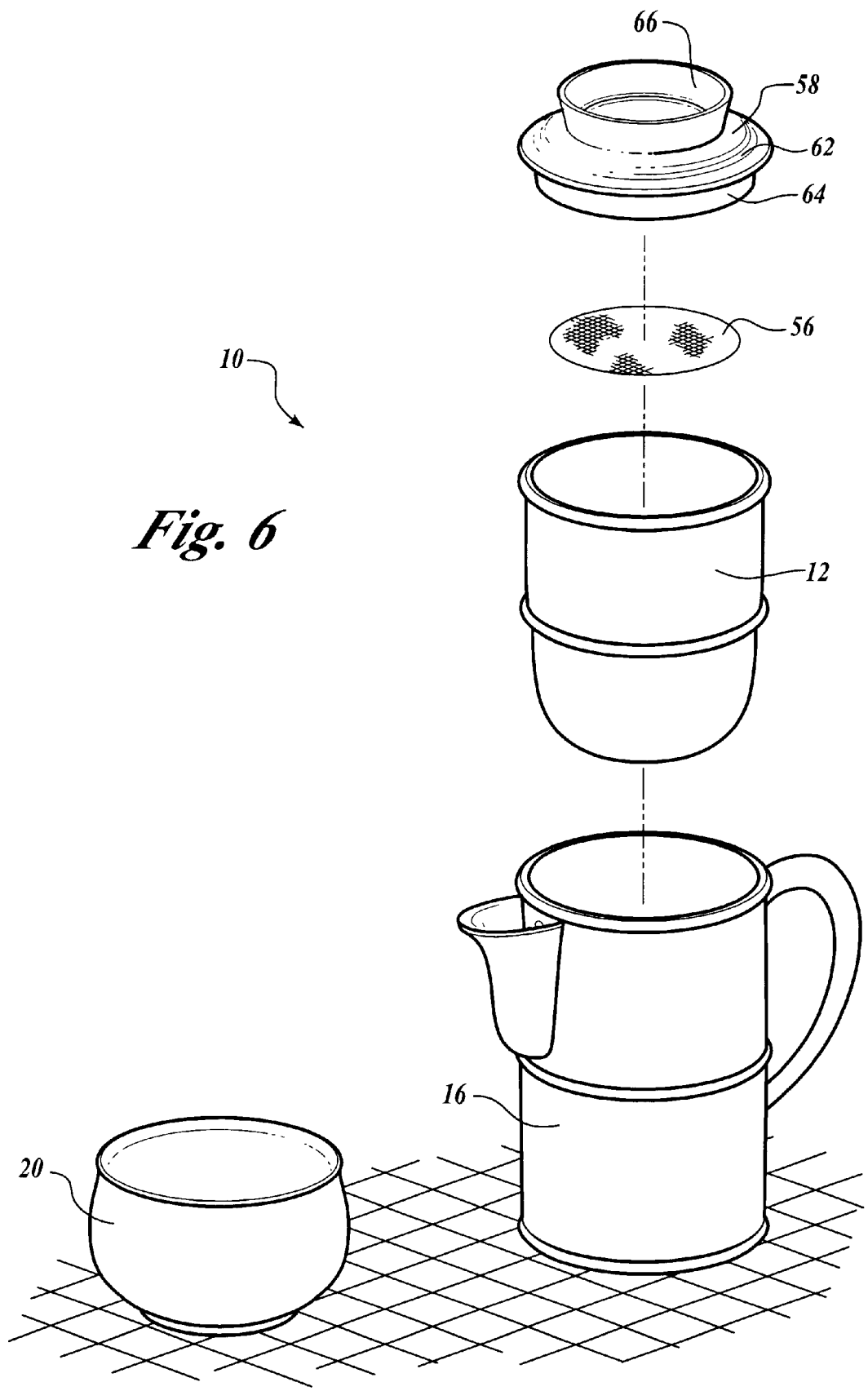
FIG. 6 is an exploded view of the present invention showing a disk-shaped mesh filter and an alternative optional lid.
Figure 7:
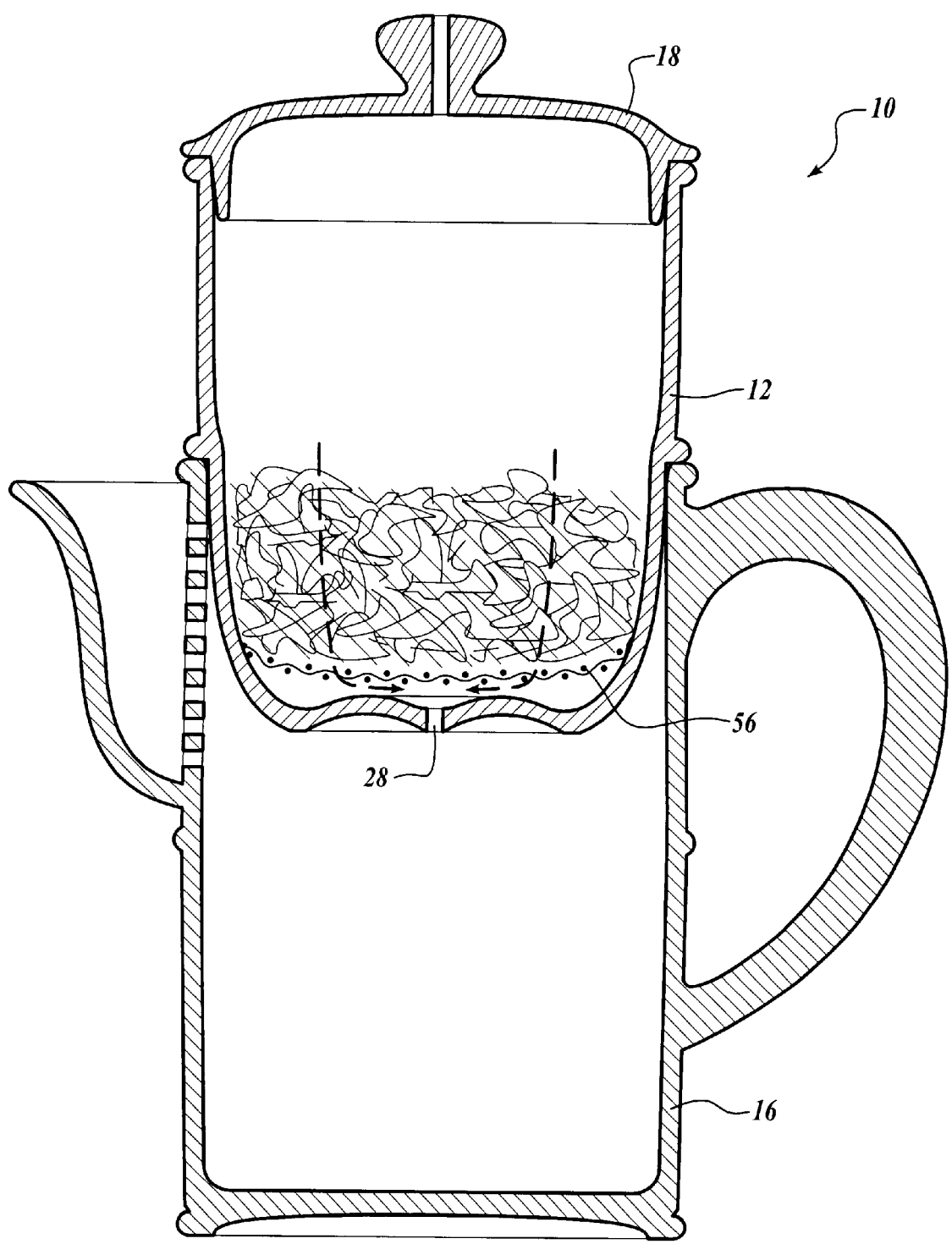
FIG. 7 is a sectional view of the present invention showing a disk shaped mesh filter and the optional lid.
Figure 8:
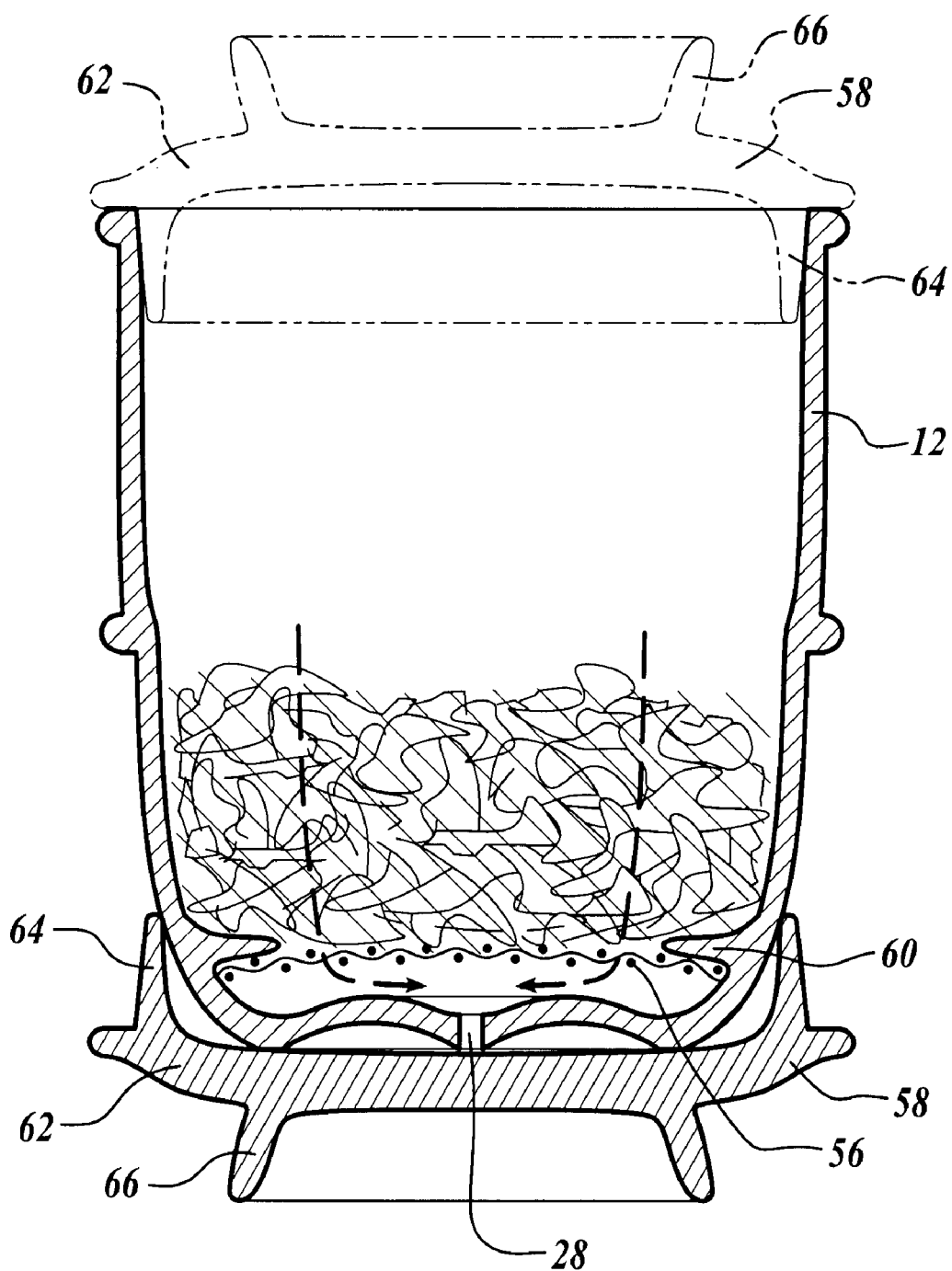
FIG. 8 is a sectional view of the present invention showing a disk-shaped mesh filter in the tea brewer and the optional alternative lid of FIG. 6 used as saucer.

FIGS. 6–8 illustrate an embodiment having an alternative mesh filter 56 and an optional alternative lid 58. With reference to FIG. 6, mesh filter 56 is generally disk shaped. Mesh filter 56 can be flat or flat with a slight curvature, for example, a concave or convex curve. The material and density of disk shape mesh filter 56 is preferably the same as basket shape mesh filter 14. With reference to FIG. 7, mesh filter 56 is generally placed at the lower part of tea brewer 12, above the water discharge hole 28. With reference to FIG. 8, mesh filter 56 may alternatively be inserted below an annular convex ring 60 located in the inner body of tea brewer 12. Mesh filter 56 may be removed by applying pressure to the mesh filter through water discharge hole 28. Mesh filter 56 is sized to fit inside tea brewer 12 so that the area between the mesh filter and the water discharge hole is sufficient to allow the proper discharge of water from the tea brewer without clogging. The diameter of mesh filter 24, not including the mesh area that was covered under the annular convex ring 60, is preferably from 30% to 70% of the diameter of tea brewer 12, and most preferably from 50% to 60% of the diameter of the tea brewer, measuring from the greatest diameter of tea brewer 12. At a diameter of less than 30% of the diameter of the tea brewer, mesh filter 56 tends to sit close to water discharge hole 28 and prevent adequate water flow into the water discharge hole. A diameter larger than 70% of the diameter of tea brewer 12 causes mesh filter 56 to sit close to the opening of tea brewer 16, making the area between mesh filter 56 and the open upper end 24 of tea brewer 12 inadequate to hold the optimum amount of tealeaves.

With reference to FIG. 6, the optional alternative lid 58 comprises a body 62 having a bottom annular rim 64 and a top annular rim 66. The diameter of bottom annular rim 64 is designed to fit inside open upper end 24 of tea brewer 12 and outside closed lower end 26 of tea brewer 12; when lid 58 is turned upside down, it may be used as the saucer for tea brewer 12. In this application, top annular rim 66 becomes the stand of the saucer to rest on a flat surface. Alternatively, body 62 can be configured flat to rest on a surface when lid 58 is turned upside down.

Virtually any material can be used to make the tea brewing system, including but not limited to clay, purple clay, porcelain, glass, plastic, paper, iron, steel, wood, and P.C. plastic glass. Among them, clay and porcelain are preferable. Clay and porcelain heated at 1180° C. yield most preferred tea brewer for brewing traditional Chinese tea.

The most preferred clay is purple clay from China's Jiangsu province. China's Jiangsu province is not only renowned for its green tea, but also the famous "Zi-sha" clay of Yi-Xing County. Like Mao Feng, Yi-xing is sometimes referred to as Yang-xian, the area's ancient name. The region has been the home of countless artisans since the Ming dynasty. Here in close proximity have lived painters, calligraphers, and ceramic artists for five hundred years. These artisans have worked together with the area's remarkable clay to produce the world's greatest tradition in fine tea ware. Stylistically rich, detailed and delicate, and yet extremely useful, Yi-xing teapots are an essential element of the Chinese art of tea. Throughout the world, these teapots are treasured by both tea drinkers and collectors as the finest tea ware available. The finest pots require a lot of time and effort. The clay itself is found in the area's craggy cliffs. The clay is crushed, then sieved, then stored for three to five years before it can be used. The end result is a pot that is smooth on the outside, and which over the years will take on a rich patina. On the inside, the numerous tiny pores allow the pot to absorb up to two percent of its weight in water. It is this quality, combined with the pot's high iron content, about nine point two percent, that enables Yi-xing teapots to make the most flavored tea.

The most preferred porcelain is from China's Fujian province. Located in central Fujian province, Dehua, is a renowned center of porcelain production. Dehua possesses its own unique characteristics as well as a special place in the history of fine porcelain. Its attributes are poetically recounted in the following manner: As white as snow, bright like a mirror, as thin as paper, and resounds with a bell-like tone. At its beginning during the cultural high point of the Tang and Song dynasties which was about one thousand years ago, Dehua exhibited two special glazes, a pale blue-green and an even more delicate pale jade. In the Ming dynasty, which was about four hundred years ago, a new style developed which still exists, a brilliant ivory white. Both in China and throughout the world, Dehua maintains its reputation for excellence and is passionately collected.

The present invention is better understood with reference to the following description of alternative embodiments. It will be appreciated that these embodiments are offered as examples only, and that the present invention is not limited to these particular embodiments.

In an alternative embodiment, the tea brewer and teapot is made of purple clay that is heated at a temperature of 1180° C. The mesh filter is shaped as a basket and is made of a stainless steel mesh net with density of 120 holes per square inch. The depth (height) of the filter mesh basket is 6.5 cm. The diameter of the upper opening of the filter basket is 6.5 cm, with a 0.4 cm wide circular edge around the opening. In use, the filter basket sits inside the tea brewer with the circular edge touching the inside wall of the tea brewer. The filter is removable. The height of tea brewer is about 9.5 cm. The tea brewer is shaped with an upper part and tapered lower part. On the outside wall of the tea brewer, there is an annular raised ring located between the upper part and the lower part. The tea brewer rests on the teapot wherein the open upper end the teapot fits under the annular convex ring of the tea brewer, and the closed lower end of the tea brewer sits inside the open upper end of the teapot. The height of the open upper end of the tea brewer is approximately 5 cm, and the height of the closed lower end is about 4.5 cm. The diameter of the tea brewer at the open upper end is about 7.5 cm. The volume of the tea brewer is 240 cc. The diameter of the water discharge hole is approximately 0.2 cm. The height of the teapot is 12.5 cm. The diameter of the inside of the upper opening of the teapot is approximately 7.25 cm. The volume of the teapot is 425 cc. In use, the water filling up the tea brewer is completely discharged from the tea brewer through the water discharge hole into the teapot in about one minute and fifty seconds, which is the tea brewing time. The depth of the brewed tea that is fully discharged into the teapot from the tea brewer is 6.5 cm. The depth of the tea brewer lower part inserted into the teapot is 4.5 cm. This allows the distance between the bottom of the tea brewer and the level of brewed tea so that the tealeaves that already soaked in water in the tea brewer will not again be soaked in brewed tea.

The specification for several alternative embodiments is presented below for purposes of example only, and in no way does reference to these examples limit the scope of the present invention. In each of these alternative embodiments the tea brewer and teapots are made of purple clay that is heated at a temperature of 1180° C. The mesh filter is disk shaped and is generally flat with slight concave in the middle. The mesh filter is made of stainless steel with a density of 120 holes per square inch. The mesh filter is inserted under an annular convex ring around the inner body of the tea brewer at the lower part of the tea brewer. The filter diameter below indicates the diameter of the mesh filter not counting the area covered by the annular convex ring. The tea brewer is shaped with an open upper end and a tapered, closed lower end. On the outside wall of the tea brewer is a raised annular ring located between the upper part and the lower part. In use, the tea brewer rests on the teapot wherein the open upper end of the teapot fits under the raised annular ring of the tea brewer and surrounds the closed lower end of the tea brewer. The numbers and sizes indicated below are approximate. The tea brewer diameter below indicates the diameter of the tea brewer measurement on widest part of the body. The teapot diameter indicates the diameter of the inside of the open upper end of the teapot. Tea brewing time below indicates the time that water filling up the tea brewer is completely discharged from the tea brewer through the water discharge hole into the teapot. Brewed tea level below indicates the level of brewed tea after completely discharged from the tea brewer into the teapot.

A

| | |
|---|---|
| Filter diameter: 4 cm | Tea brewer volume: 180 cc |
| Water discharge hole diameter: 0.2 cm | Teapot height: 12 cm |
| Tea brewer height: 7 cm | Teapot diameter: 7 cm |
| Tea brewer open upper end height: 3 cm | Teapot volume: 450 cc |
| Tea brewer closed lower part height: 4 cm | Brewed tea level: 4 cm |
| Tea brewer diameter: 7 cm | Tea brewing time: about one minute and twenty three seconds |

B

| | |
|---|---|
| Filter diameter: 4 cm | Tea brewer volume: 175 cc |
| Water discharge hole diameter: 0.2 cm | Teapot height: 11.5 cm |
| Tea brewer height: 6.5 cm | Teapot diameter: 6.9 cm |
| Tea brewer open upper end height: 2.5 cm | Teapot volume: 350 cc |
| Tea brewer closed lower part height: 4 cm | Brewed tea level: 4.2 cm |
| Tea brewer diameter: 6.9 cm | Tea brewing time: about one minute and twenty seconds |

C

| | |
|---|---|
| Filter diameter: 4.5 cm | Tea brewer volume: 180 cc |
| Water discharge hole diameter: 0.2 cm | Teapot height: 12 cm |
| Tea brewer height: 5.5 cm | Teapot diameter: 7.5 cm |
| Tea brewer open upper end height: 2.5 cm | Teapot voiume: 375 cc |
| Tea brewer closed lower part height: 3 cm | Brewed tea level: 4.1 cm |
| Tea brewer diameter: 7.5 cm | Tea brewing time: about one minute and eleven seconds |

D

| | |
|---|---|
| Filter diameter: 4.5 cm | Tea brewer volume: 200 cc |
| Water discharge hole diameter: 0.2 cm | Teapot height: 12.5 cm |
| Tea brewer height: 6.5 cm | Teapot diameter: 7.5 cm |
| Tea brewer open upper end height: 2.6 cm | Teapot volume: 475 cc |
| Tea brewer closed lower part height: 3.9 cm | Brewed tea level: 4.1 cm |
| Tea brewer diameter: 7.5 cm | Tea brewing time: about one minute and five seconds |

E

| | |
|---|---|
| Filter diameter: 5.3 cm | Tea brewer volume: 250 cc |
| Water discharge hole diameter: 0.2 cm | Teapot height: 12 cm |
| Tea brewer height: 7.2 cm | Teapot diameter: 8.1 cm |
| Tea brewer open upper end height: 3.2 cm | Teapot volume: 475 cc |
| Tea brewer closed lower part height: 4 cm | Brewed tea level: 5.6 cm |
| Tea brewer diameter: 8.1 cm | Tea brewing time: about one minute and thirty three seconds |

F

| | |
|---|---|
| Filter diameter: 5.3 cm | Tea brewer volume: 250 cc |
| Water discharge hole diameter: 0.2 cm | Teapot height: 13.2 cm |
| Tea brewer height: 8.2 cm | Teapot diameter: 8.5 cm |
| Tea brewer open upper end height: 3.5 cm | Teapot volume: 750 cc |
| Tea brewer closed lower part height: 4.7 cm | Brewed tea level: 4.1 cm |
| Tea brewer diameter: 8.5 cm | Tea brewing time: about one minute and thirty six seconds |

G

| | |
|---|---|
| Filter diameter: 5.2 cm | Tea brewer volume: 240 cc |
| Water discharge hole diameter: 0.2 cm | Teapot height: 12 cm |
| Tea brewer height: 7.5 cm | Teapot diameter: 8 cm |
| Tea brewer open upper end height: 3 cm | Teapot volume: 500 cc |
| Tea brewer closed lower part height: 4.5 cm | Brewed tea level: 4.5 cm |
| Tea brewer diameter: 8 cm | Tea brewing time: about one minute and thirty seconds |

While the preferred embodiment of the invention has been illustrated and described, it will be appreciated that various changes can be made therein without departing from the spirit and scope of the invention.

When the embodiments of the invention in which an exclusive property or privilege is claimed are defined as follows:

1. An automatic Chinese tea brewing system, comprising:
   (a) a teapot having an upper end and a lower end, the upper end being open and the lower end being closed;
   (b) a tea brewer for brewing tea having an upper end and a lower end, the upper end being open and the lower end being closed, the lower end having a water discharge hole sized smaller than the opening in the tea brewer upper end, the tea brewer removably resting on the teapot so that the teapot is positioned to receive brewed tea discharged from the tea brewer through the water discharge hole;
   (c) a mesh filter located above the water discharge hole within the tea brewer; and,
   (d) a lid having a top and a bottom, wherein the bottom of the lid is sized to fit the bottom of the tea brewer whereby the lid acts as a saucer for the tea brewer.

2. The automatic Chinese tea brewing system of claim 1, wherein the closed lower end of the tea brewer is curved.

3. The automatic Chinese tea brewing system of claim 1, wherein the teapot is sized to receive the full amount of brewed tea discharged from the tea brewer through the water discharge hole so that the level of brewed tea does not reach the bottom of the tea brewer.

4. The automatic Chinese tea brewing system of claim 1, wherein the tea brewer is sized to control the amount of tealeaves, water, and tea-brewing time.

5. The automatic Chinese tea brewing system of claim 1, wherein the water discharge hole of the tea brewer is sized to control tea-brewing time.

6. The automatic Chinese tea brewing system of claim 1, wherein the mesh filter located above the water discharge hole within the tea brewer is sized such that the area between the mesh filter and the water discharge hole is sufficient to allow brewed tea to be discharged from through the water discharge hole without clogging the water discharge hole.

7. The automatic Chinese tea brewing system of claim 1, wherein the mesh filter is shaped as a basket and is insertable inside the tea brewer.

8. The automatic Chinese tea brewing system of claim 1, wherein the mesh filter is shaped as a disk and is inserted into the tea brewer and removable by applying pressure through the water discharge hole.

9. The automatic Chinese tea brewing system of claim 8, wherein:
   (a) the tea brewer further comprises an annular convex ring around the inner body of the tea brewer; and
   (b) the mesh filter is inserted under the annular convex ring.

10. The automatic Chinese tea brewing system of claim 9, wherein:
    (a) the tea brewer has a body with upwardly extending sides between the closed lower end and the open upper end; and
    (b) the diameter of the mesh filter not counting the area covered by the annular convex ring is from 30% to 70% of the diameter of the tea brewer measuring from the widest part of the interior of the tea brewer.

11. The automatic Chinese tea brewing system of claim 9, wherein:
    (a) the tea brewer has a body with upwardly extending sides between the closed lower end and the open upper end; and
    (b) the diameter of the mesh filter not counting the area covered by the annular convex ring is from 50% to 60% of the diameter of the tea brewer measuring from the widest part of the interior of the tea brewer.

12. The automatic Chinese tea brewing system of claim 1, wherein:
    (a) the lower end of the tea brewer is tapered towards the water discharge hole; and
    (b) the upper end of the tea brewer rests on the open upper end of the teapot as the lower end of the tea brewer fits inside the open upper end of the teapot.

13. The automatic Chinese tea brewing system of claim 1, wherein:
    (a) the tea brewer has a body with upwardly extending sides between the closed lower end and the open upper end;
    (b) the tea brewer further comprising a raised annular rim on the outside of the tea brewer body; and
    (c) the raised annular rim of the tea brewer rests on the open upper end of the teapot as the lower end of the tea brewer fits inside the open upper end of the teapot.

14. The automatic Chinese tea brewing system of claim 1, further comprising a saucer sized to fit the bottom of the tea brewer.

15. The automatic Chinese tea brewing system of claim 1, wherein the tea brewer is made of a clay material.

16. The automatic Chinese tea brewing system of claim 15, wherein the tea brewer is made of a purple clay material.

17. The automatic Chinese tea brewing system of claim 1, wherein the tea brewer is made of a porcelain material.

18. The automatic Chinese tea brewing system of claim 1, wherein:
    (a) the volume of the tea brewer is from 120 cc to 270 cc;
    (b) the diameter of the water discharge hole in the tea brewer is from 0.16 cm to 0.25 cm; and
    (c) the mesh filter is of tiny mesh with the density of the mesh is from 90 to 150 holes per square inch.

19. The automatic Chinese tea brewing system of claim 1, wherein:
    (a) the volume of the tea brewer is from 150 cc to 240 cc;
    (b) the diameter of the water discharge hole in the tea brewer is from 0.18 cm to 0.2 cm; and
    (c) the mesh filter is of tiny mesh with the density of the mesh is 120 holes per square inch.

20. A method for brewing Chinese tea using a tea brewing system comprising a tea brewer for brewing tea having an upper end and a lower end, the upper end being open and the lower end being closed, the lower end having a water discharge hole sized smaller than the opening in the tea brewer upper end, a mesh filter shaped as basket and removably inserted in the tea brewer above the water discharge hole, and a teapot having an upper end and a lower end, the upper end being open and the lower end being closed, a lid having a top and a bottom, wherein the bottom of the lid is sized to fit the bottom of the tea brewer whereby the lid acts as a saucer for the tea brewer, comprising:
    (a) resting the tea brewer on the open upper end of the teapot so that the teapot is positioned to receive the brewed tea discharged from the tea brewer through the water discharge hole;
    (b) placing tealeaves into the tea brewer inside the mesh filter;
    (c) pouring water into the tea brewer, causing the tealeaves to be soaked by the water in the tea brewer;
    (d) discharging brewed tea from the tea brewer by natural flow of water from the tea brewer through the water discharge hole into the teapot, wherein the tea brewing time is controlled based on the predetermined size of the tea brewer and the water discharge hole; and
    (e) separating the soaked tealeaves from the brewed tea based on the position of the tea brewer in relation to the teapot and the size of the teapot, whereby brewed tea is discharged from the tea brewer fully into the teapot such that the level of brewed tea does not reach the lower end of the tea brewer, while soaked tealeaves are retained in the tea brewer.

21. A method for brewing Chinese tea using a tea brewing system comprising a tea brewer having a body with upwardly extending sides between a closed lower end and an open upper end, the lower end having a water discharge hole sized smaller than the opening in the tea brewer upper end, the lower inner body of the tea brewer having an annular convex ring, a mesh filter shaped as a disk removably inserted between the annular convex ring and the water discharge hole in the interior of the tea brewer, and a teapot having an upper end and a lower end, the upper end being open and the lower end being closed, a lid having a top and a bottom, wherein the bottom of the lid is sized to fit the bottom of the tea brewer whereby the lid acts as a saucer for the tea brewer, comprising:
    (a) resting the tea brewer on the open upper end of the teapot so that the teapot is positioned to receive the brewed tea discharged from the tea brewer through the water discharge hole;
    (b) placing tealeaves into the tea brewer on top of the mesh filter;
    (c) pouring water into the tea brewer, causing the tealeaves to be soaked by the water in the tea brewer;
    (d) discharging brewed tea from the tea brewer by natural flow of water from the tea brewer through the water discharge hole into the teapot, wherein the tea brewing time is controlled based on the predetermined size of the tea brewer and the water discharge hole; and separating the soaked tealeaves from the brewed tea based on the position of the tea brewer in relation to the teapot and the size of the teapot, whereby brewed tea is discharged from the tea brewer fully into the teapot such that the level of brewed tea does not reach the lower end of the tea brewer, while soaked tealeaves are retained in the tea brewer.

\* \* \* \* \*